(12) United States Patent
Kracht

(10) Patent No.: US 7,708,333 B2
(45) Date of Patent: May 4, 2010

(54) PIVOTABLE VEHICLE ROOF

(75) Inventor: Andre Kracht, Osnabrück (DE)

(73) Assignee: Wilhelm Karmann GmbH, Osnabruck (DE)

( * ) Notice: Subject to any disclaimer, the term of this patent is extended or adjusted under 35 U.S.C. 154(b) by 778 days.

(21) Appl. No.: 11/547,114

(22) PCT Filed: Mar. 17, 2005

(86) PCT No.: PCT/DE2005/000484

§ 371 (c)(1), (2), (4) Date: Oct. 2, 2006

(87) PCT Pub. No.: WO2005/095139

PCT Pub. Date: Oct. 13, 2005

(65) Prior Publication Data

US 2008/0315617 A1    Dec. 25, 2008

(30) Foreign Application Priority Data

Apr. 1, 2004  (DE) ................. 10 2004 016 202

(51) Int. Cl.
B60J 7/00 (2006.01)
(52) U.S. Cl. ............. 296/108; 296/107.08; 296/107.16; 296/107.17
(58) Field of Classification Search .............. 296/76, 296/108, 107.08, 107.17, 136.07, 107.16, 296/136.04, 136.01, 136.05, 136.06
See application file for complete search history.

(56) References Cited

U.S. PATENT DOCUMENTS

| | | | |
|---|---|---|---|
| 3,357,738 A * | 12/1967 | Bourlier | 296/108 |
| 3,823,977 A | 7/1974 | Fioravanti | |
| 6,419,308 B1 * | 7/2002 | Corder et al. | 296/216.02 |
| 6,497,446 B2 * | 12/2002 | Obendiek | 296/107.17 |
| 6,527,332 B2 * | 3/2003 | Fioravanti | 296/107.17 |
| 6,672,658 B2 * | 1/2004 | De Gaillard | 296/220.01 |
| 6,796,594 B2 * | 9/2004 | Antreich | 296/107.08 |
| 6,827,392 B2 * | 12/2004 | Doncov et al. | 296/147 |
| 2004/0056507 A1 * | 3/2004 | Guillez et al. | 296/108 |
| 2004/0075305 A1 | 4/2004 | DeGaillard et al. | |

FOREIGN PATENT DOCUMENTS

| | | |
|---|---|---|
| DE | 36 35 887 | 5/1988 |
| DE | 40 28 712 | 3/1992 |
| EP | 0 901 421 | 4/2000 |
| EP | 1 352 768 | 10/2003 |
| GB | 783345 | 9/1957 |
| GB | 2194759 | 3/1988 |
| JP | 62-198517 | 9/1987 |

* cited by examiner

*Primary Examiner*—Patricia L Engle
*Assistant Examiner*—Sunsurraye Westbrook
(74) *Attorney, Agent, or Firm*—Michael Best & Friedrich LLP

(57) ABSTRACT

A convertible vehicle roof (20) comprises a forward roof element (22) and a rearward roof element (24). An unchangeable, upwardly opened, recessed storage area (14) for the roof elements is defined in a rear trunk lid (12). The forward roof element may be pivoted relative to the rearward roof element about a first axis (A1) that is perpendicular to the vehicle longitudinal plane. The forward roof element and the rearward roof element also may be pivoted together about a second axis (A2) that extends perpendicular to the vehicle longitudinal plane. At least the forward roof element is curved such that, in the open position of the vehicle roof, i.e. when it is folded onto the rearward roof element and is stored in the storage area, it forms a substantially continuous, curved outer shell together with the rear trunk lid.

12 Claims, 6 Drawing Sheets

PIVOTABLE VEHICLE ROOF

CROSS-REFERENCE

This application is the US national stage filing of International Application No. PCT/DE2005/000484 filed Mar. 17, 2005, which claims priority to German patent application No. 10 2004 016 202.6 filed Apr. 1, 2004.

TECHNICAL FIELD

The invention concerns a vehicle roof that is, in particular, useable for a passenger vehicle. The invention is, in particular, directed to a vehicle roof that is pivotable between an open and a closed position.

Such vehicle roofs are utilized, in particular, as hard top roofs, i.e. rigid roofs, in order to convert a vehicle from a closed passenger vehicle into an open passenger vehicle and vice versa.

Outwardly pivotable vehicle roofs for passenger vehicles are known in the art, wherein in the open position of the roof, the vehicle roofs either are generally stored in the interior of the rear portion of the vehicle or are settable on the rear luggage space of the vehicle. If the vehicle roof is loaded into the rear luggage space of the vehicle, costly kinematics are required in order to stow the vehicle roof and/or to move the vehicle roof from the open position into the closed position of the vehicle roof.

Therefore, DE 3635887 A1 proposes a pivotable vehicle roof that is, after the opening thereof, settable on the rear trunk lid. The vehicle roof consists of a unit that comprises the rear window and a roof and that has a linkage at the junction of the rear window to the rear trunk lid, as well as at the junction between the roof and the rear window linkage. Together with pivot arm pairs, these linkages serve to guide and to move the roof so as to remain parallel to itself during its opening- and closing movements. The roof is subsequently set in the folded-together state on the lid of the rear luggage space in the open position. In order to achieve a silhouette of the vehicle that remains the same in the area of the rear luggage space as well as in the open and closed states of the vehicle roof, the lid of the rear luggage space is lowered by about the thickness of the unit including the rear window and the roof during storage of this unit, so that the vehicle roof, which is set over the rear trunk lid, comes to lie in its open position at about the height at which the rear trunk lid of the rear luggage space is disposed when the vehicle roof is closed. By lowering a part of the rear trunk lid of the vehicle, it is thus ensured in the open, as well as in the closed, position of the vehicle that the outer silhouette of the vehicle in the rear area remains substantially unchanged.

SUMMARY

A motor vehicle with a rigid roof is known from EP 0901421 B1, wherein the vehicle roof is pivotable between an open and a closed position. In the open position, the one-piece vehicle roof is settable on the rear area of the motor vehicle. In particular, in the open state, the roof is set on the luggage space lid of the vehicle. The locations of the pivot axis, about which the vehicle roof is rotatable, and the pivot axis of the luggage space lid are chosen such that they coincide, whereby the luggage space lid can be upwardly pivoted and opened when the vehicle roof is opened.

It is the object of the invention to provide a vehicle roof for a passenger vehicle that is pivotable between an open and a closed position, by means of which the character of the vehicle can be changed from a pickup-like vehicle when the roof is closed into a convertible vehicle.

In a preferred aspect of the present teachings, a vehicle roof, which is particularly suitable for a passenger vehicle, is pivotable between an open and closed position, and comprises a forward roof element, a rearward roof element and an unchangeable, upwardly opened, recessed storage area designed to accommodate the roof elements on a rear trunk lid of the vehicle. In the open position of the vehicle roof, the forward roof element is settable on the rearward roof element and is also settable together with the rearward roof element in the storage area. Furthermore, in the open position, the roof elements preferably are substantially completely accommodated in the storage area and the outer surface of the forward roof element forms a curved outer shell together with the rear trunk lid.

The concept underlying the invention is to provide the rear trunk lid of the vehicle with a cavity, so that the rear area of the vehicle is similar to a pickup vehicle when the vehicle roof is closed. At the same time, due to the double folding of the vehicle roof, i.e. the two-part design of the vehicle roof and the pivotability of the two parts of the vehicle roof with respect to each as well as together about a rear-sided axis, it is achieved that the convex curvature of the forward roof part forms the outer shell of the rear area in the open state of the vehicle roof. By suitable adaptation of the geometric dimensions of the forward, convex roof part, which forms the outer shell of the rear area in the open state of the vehicle roof, as well as the dimensions, in particular the height of the pivotable unit, to the dimensions of the cavity of the rear trunk lid, the character of the vehicle is changed into that of a convertible vehicle without a pickup rear end when the vehicle roof is opened, because the junction between rear trunk lid and roof area is level, i.e. without perceptible steps or extraordinary changes of radius of curvature.

The cavity and/or recess formed in the rear area of the vehicle can optionally be integrated into the rear trunk lid of the vehicle, i.e. side edges of the cavity are themselves formed in the rear trunk lid. In the alternative, it is also conceivable to form the side edges of the cavity outside of the rear trunk lid, so that the rear trunk lid forms only the floor of the recess and the rearward side wall of the recess.

BRIEF DESCRIPTION OF THE DRAWINGS

In the following, the invention will be described in an exemplary manner with the assistance of the appended figures, in which.

DETAILED DESCRIPTION OF THE INVENTION

Figure 1:
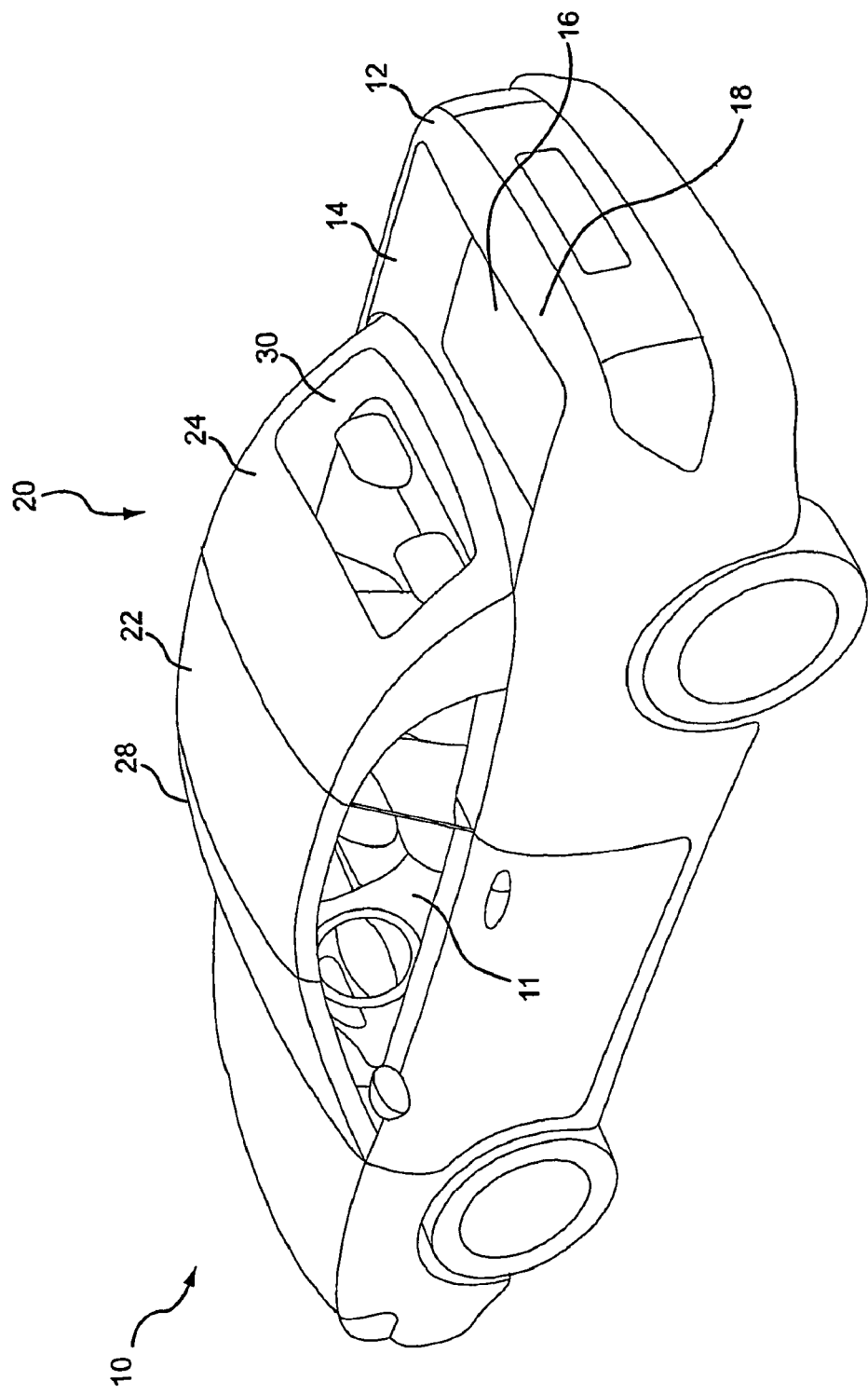
FIG. 1 is a perspective view of a vehicle having an inventive roof structure, wherein the vehicle roof is in the closed position.
Figure 2:
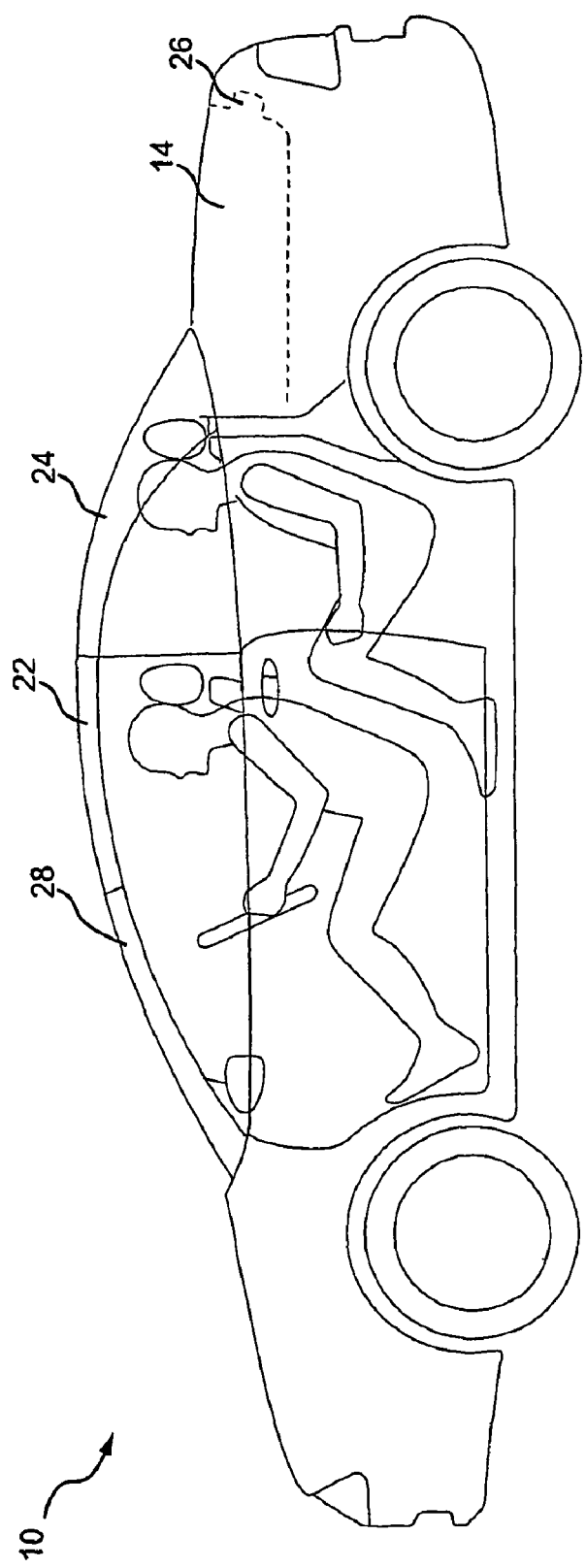
FIG. 2 is a side view of the vehicle of FIG. 1.

In FIGS. 1 to 6, a vehicle 10 is illustrated that has an inventive vehicle roof 20. In FIGS. 1 and 2, the vehicle roof 20, which is movable between an open position and a closed position, is in the closed position.

The vehicle roof 20 has a forward roof part 22 and a rearward roof part 24. The expressions "forward", "rear", "rearward," etc., respectively refer to the forward driving direction of the vehicle 10.

The forward roof part 22, as well as the rearward roof part 24, has a convex curvature when it is in the closed position. In this closed position, the forward roof part 22 and the rearward roof part 24 cover the passenger compartment 11 of the vehicle, so that a closed passenger vehicle is formed. In particular, the roof parts thus extend from a windshield frame 28 to a rear area of the vehicle 10. Further, a rear window 30 is preferably integrated into the rearward or rear roof 24.

The forward roof part 22 is pivotable with respect to the rearward roof part 24 about a first axis A1 that extends substantially perpendicular to a vehicle longitudinal plane and is situated at hinge points between the forward roof part 22 and the rearward roof part 24. The forward roof part can thereby be folded onto the rearward roof part.

In addition, a second pivot axis A2 is provided, about which axis the two roof parts 22, 24 can be pivoted for respectively opening and closing the vehicle roof. This second axis A2 can coincide with a pivot axis, about which a rear trunk lid 12 of the vehicle is upwardly pivotable for opening the luggage space of the vehicle. This axis likewise extends perpendicular to the vehicle longitudinal plane and e.g., on the rear-side of the rear roof part, i.e. in the connection area between the roof part and the luggage space trunk lid.

Figure 3:
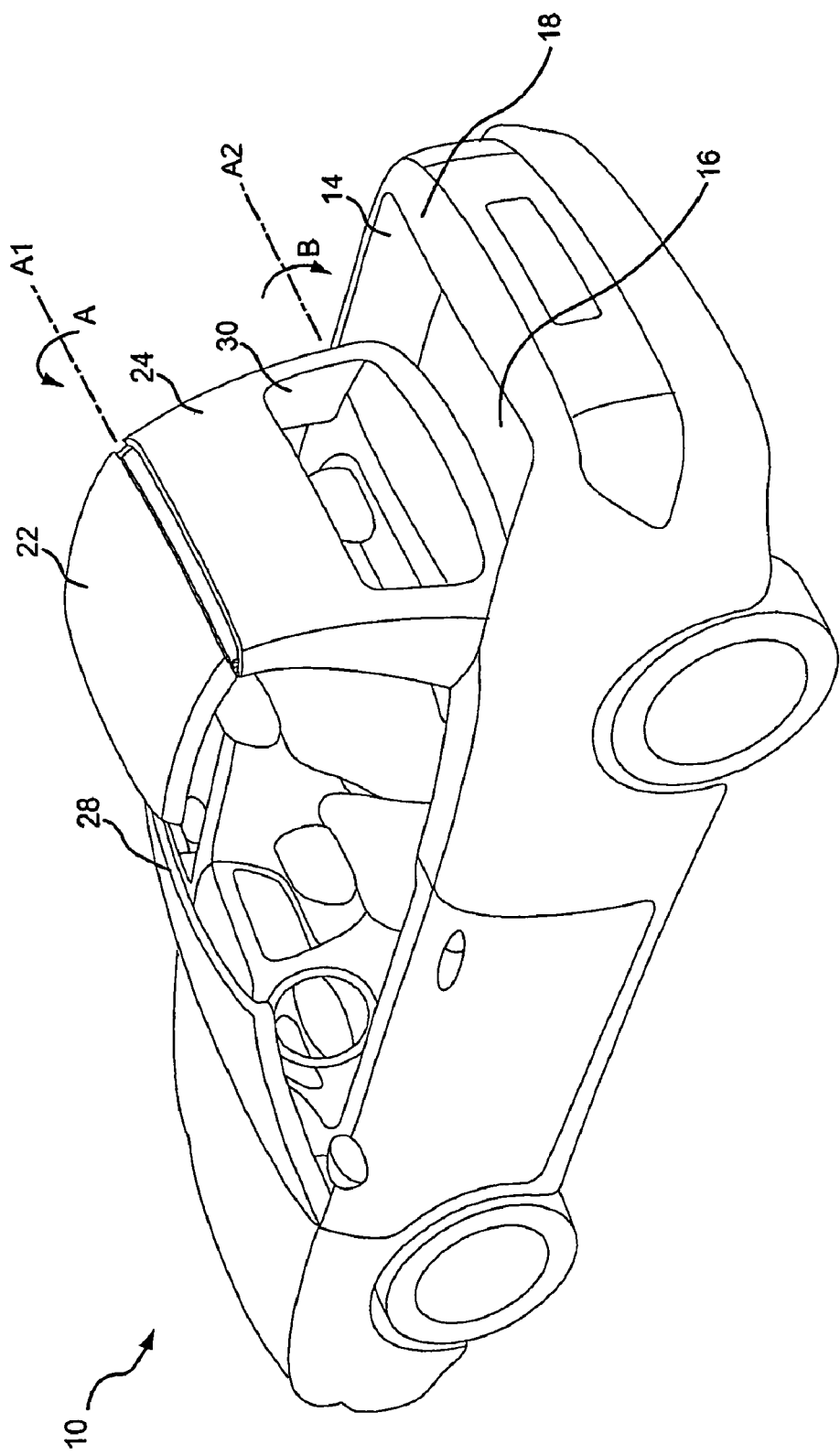
FIG. 3 shows a perspective view of the inventive vehicle roof during pivoting into an open position.
Figure 4:
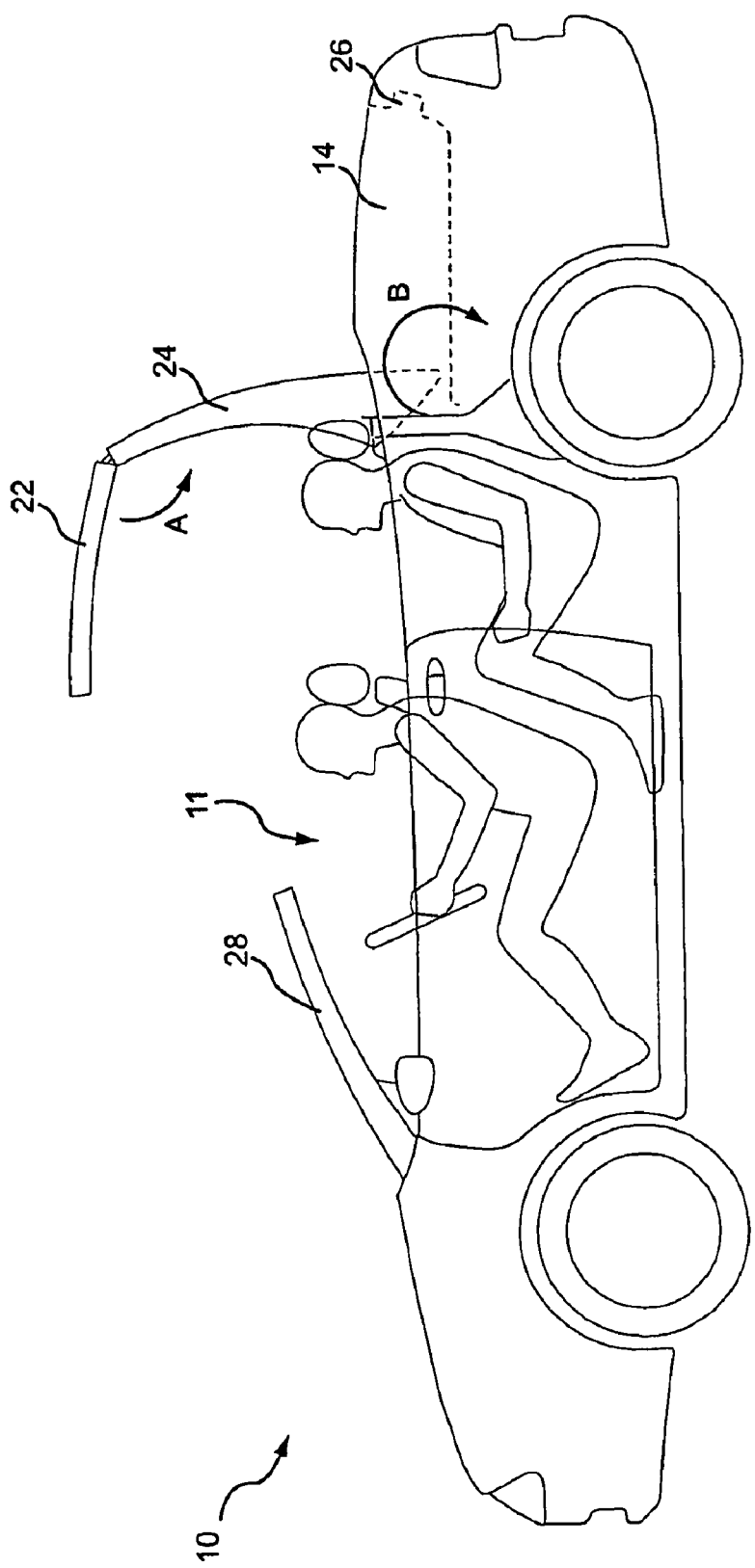
FIG. 4 shows a side view of the vehicle with the vehicle roof of FIG. 3.
Figure 5:
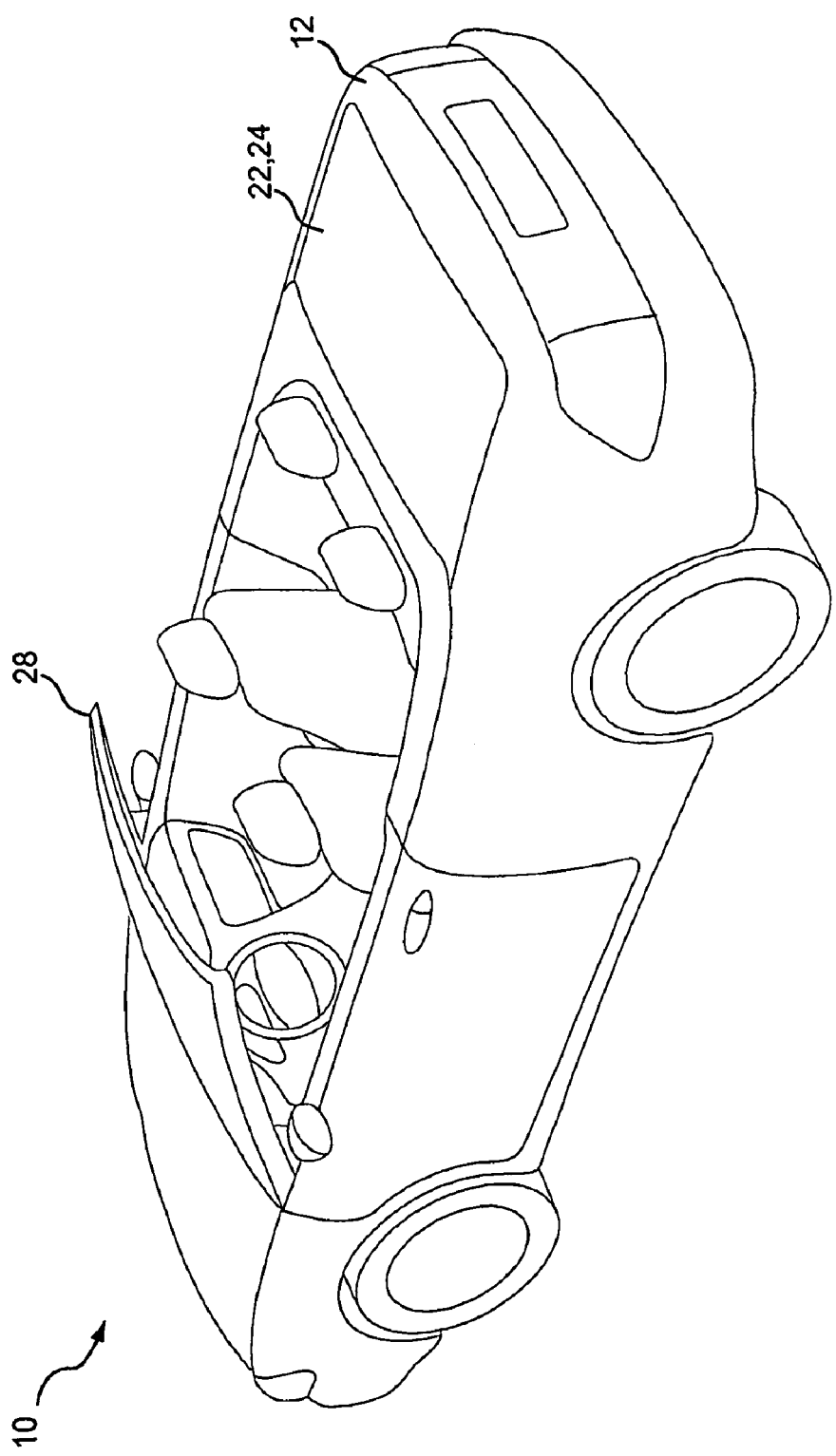
FIG. 5 shows a perspective view of the vehicle of FIGS. 1 to 4, wherein the vehicle roof is in the open position.
Figure 6:
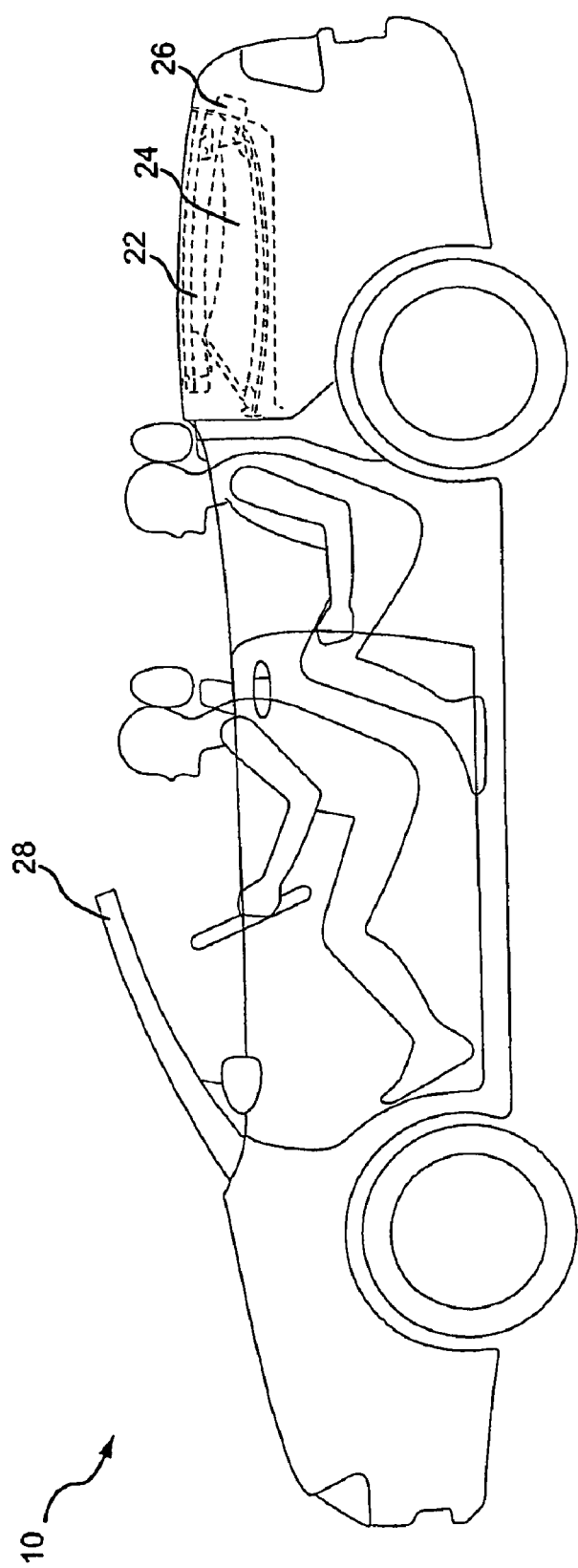
FIG. 6 shows a side view of the vehicle of FIG. 5.

For opening the vehicle roof 20 from the closed position into the open position shown in FIGS. 5 and 6, the forward roof part 22 is released from the windshield frame and is pivoted about the first axis A1 in the counter-clockwise direction with respect to the rearward roof part 24 according to the side view from the left side of the vehicle (arrow A in FIG. 3 and FIG. 4). In addition, the forward roof part 22 and the rearward roof part 24 are pivoted together about the second axis A2 in the clockwise direction (arrow B in FIG. 3 and FIG. 4), so that, on the one hand, the rearward roof part 24 comes to lie under the forward roof part 24 and on the other hand, the two respective inner surfaces of the forward roof part and the rearward roof part are directed towards each other. This means that, in the open position of the vehicle roof 20, the convex outer side of the forward roof part 22 is exposed towards the outside.

In this open position of the vehicle roof 20, the roof parts 22, 24 can be set in a cavity or recess 14 that is formed in the rear area of the vehicle 10. It is shown in the figures that a cavity 14 is formed in the rear trunk lid 12 of the vehicle, i.e. the rear trunk lid 12 of the vehicle includes a floor surface 16, side walls surrounding this floor surface and a rear wall 18. Instead of in the rear trunk lid 12, the side walls could also be provided in the fender area formed adjacent to the rear trunk lid 12, so that the rear trunk lid 12 is recessed over its entire width relative to the adjacent fender area. The rear wall 18 and the side walls rise up over the floor surface 16 to a height that corresponds to the height of the unit of the folded-together forward roof part 22 and rearward roof part 24, so that the convex outer surface of the forward roof part 22 forms a level junction with the rear wall 18 as well as also with the side walls without steps, i.e. it is flush when the vehicle roof is set in the cavity 14 of the rear trunk lid 12. Preferably, at the junction between the roof unit and the rear trunk lid and/or fender, the curvature of the convex outer surface of the forward roof part 22 corresponds to the curvature of the elevations of the rear trunk lid 12, i.e. the rear wall 18 and/or the side walls, so that a continuous junction is achieved.

Preferably, the roof parts 22, 24 are formed as hard top parts, i.e. rigid roof parts.

The roof parts 22, 24 can be actuated manually or in an electronically- and/or hydraulically-assisted manner and/or fully automatic electronically and/or hydraulically. For example, suitable linkage mechanisms are provided for moving the roof parts, which linkage mechanisms are known.

If the pivot axis A2, i.e. the axis with which the forward roof part and the rearward roof part are pivoted together relative to the vehicle body and/or the rear trunk lid 12 of the vehicle, is provided coincident with the pivot axis of the rear trunk lid 12, the rear trunk lid can be moved and the luggage space can be opened when the vehicle roof 20 is in the position set on the rear trunk lid 12. However, if the axes are not coincident, a latching mechanism is preferably provided, so that the rear trunk lid can not be opened when the roof is set on the rear trunk lid. The latching mechanism can, e.g., be implemented as a mechanical latch and/or as an electronically-assisted latch. In the alternative to a latch mechanism that prevents an opening of the rear trunk lid 12 when the vehicle roof 20 is in the open position, actuation of an opening button or an opening handle for the rear trunk lid can initiate movement of the roof into the folded-together state before the rear trunk lid 12 is upwardly pivoted. In this case, the roof is preferably brought into the folded-together position in a vertical position, i.e. a position in which the forward roof part 22 and the rearward roof part 24 stand substantially vertical. This position is preferably situated in front of the rear trunk lid 12. After the unit of the folded-together forward roof part 22 and rearward roof part 24 is brought into this position, the rear trunk lid 12 can subsequently be opened by normal pivoting. In addition, an opening of the rear trunk lid 12 is possible in all variations without having to initiate prior movements of the vehicle roof 20, when the vehicle roof 20 is in the closed position.

The assembly with the foldable hard top roof 20 further includes a latching mechanism integrated into the rear trunk lid 12. The latch is preferably integrated in the rear wall 18 and/or the side walls of the rear trunk lid 12 and serves to securely retain the forward roof part 22 and the rearward roof part 24 in the folded position and the position set in the cavity 14 of the rear trunk lid 12. This latch 26 cooperates, e.g., with the linkage mechanism that guides the opening- and closing movement of the vehicle roof 20.

With the inventive roof construction, a vehicle 10 with a vehicle roof 20 is achieved that has a recess in the rear trunk lid 12 when the roof 20 is closed. This recess is integrated into the overall silhouette of the vehicle as a vehicle having a pickup-character. When the roof 20 is open, the forward roof half and/or the forward roof area of the set roof forms, together with the rear trunk lid, the outer shell of a flush, curved trunk lid, i.e. the rear area. By folding together the roof and setting the roof on the rear trunk lid 12, a costly mechanism for loading the folded-together roof under the rear trunk lid is avoided.

REFERENCE NUMBERS

10 Vehicle
11 Passenger compartment
12 Rear trunk lid
14 Recess
16 Floor surface
18 Rear wall
20 Vehicle roof
22 Forward roof part
24 Rearward roof part
26 Latch
28 Windshield frame 30 Rear window
A1 first axis
A2 second axis

The invention claimed is:

1. A convertible vehicle comprising:
a vehicle body,
a rear trunk lid and defining an unchangeable, upwardly opened storage area, and
a vehicle roof that is pivotable between an open and closed position with respect to the vehicle body and comprises a forward roof element pivotably coupled to a rearward roof element, wherein the forward roof element is settable on the rearward roof element and is settable together with the rearward roof element in the storage area,
wherein the storage area is dimensioned so as to substantially completely accommodate the forward and rearward roof elements on the rear trunk lid when the vehicle roof is disposed in the open position,
wherein the storage area is defined by a recess within the rear trunk lid,
wherein the storage area is bounded within the rear trunk lid by a pair of opposing, lateral elevations and a rear-sided elevation, such that the elevations align with the outer surface of the forward roof element when the roof elements are set in the storage area, and
when the vehicle roof is disposed in the open position, an outer surface of the forward roof element forms a substantially continuous, curved outer shell together with the rear trunk lid.

2. A convertible vehicle according to claim 1, further comprising a latching device arranged and constructed to permit the rear trunk lid to be opened only when the vehicle roof is disposed in the closed position.

3. A convertible vehicle according to claim 2, wherein the roof elements are rigid roof elements.

4. A convertible vehicle according to claim 3, wherein the forward roof element is pivotable relative to the rear roof element about a first axis that is disposed substantially perpendicular to a plane extending in a longitudinal direction of the vehicle, and
the forward and the rearward roof elements are pivotable together about a second axis that extends perpendicular to the vehicle longitudinal plane.

5. A convertible vehicle according to claim 1, wherein the roof elements are rigid roof elements.

6. A convertible vehicle according to claim 1, wherein the forward roof element is pivotable relative to the rear roof element about a first axis that is disposed substantially perpendicular to a plane extending in a longitudinal direction of the vehicle, and
the forward and the rearward roof elements are pivotable together about a second axis that extends perpendicular to the vehicle longitudinal plane.

7. A convertible vehicle comprising:
a vehicle body,
a rear trunk lid having a predetermined, upwardly facing recess defined in an upper surface thereof, and
a vehicle roof that is pivotable between an open and closed position with respect to the vehicle body and comprises a forward roof element pivotably coupled to a rearward roof element, wherein the forward roof element is arranged and constructed to be folded together with the rearward roof element and the folded-together roof elements are arranged and constructed to be substantially completely disposed within the recess,
wherein when the folded-together roof elements are disposed within the recess, an outer periphery of the forward roof element is arranged and constructed to form a substantially continuous, curved outer shell together with at least the rear trunk lid, and
wherein the recess in the rear trunk lid is defined at least by a pair of opposing, lateral elevations and a rear-sided elevation, such that the elevations at least substantially align with the outer periphery of the forward roof element when the roof elements are disposed in the recess.

8. A convertible vehicle according to claim 7, further comprising a latching device arranged and constructed to only permit the rear trunk lid to be opened when the vehicle roof is disposed in the closed position.

9. A convertible vehicle according to claim 7, wherein the roof elements are rigid roof elements.

10. A convertible vehicle according to claim 7, wherein the forward roof element is pivotable relative to the rear roof element about a first axis that is disposed substantially perpendicular to a plane extending in a longitudinal direction of the vehicle, and
the forward and the rearward roof elements are pivotable together about a second axis that extends perpendicular to the vehicle longitudinal plane.

11. A convertible vehicle according to claim 10, wherein the roof elements are rigid roof elements.

12. A convertible vehicle according to claim 11, further comprising a latching device arranged and constructed to only permit the rear trunk lid to be opened when the vehicle roof is disposed in the closed position.

* * * * *